Aug. 8, 1972 — R. E. McALISTER — 3,682,651
MICROWAVE PUFFING OF CEREAL GRAIN AND PRODUCTS MADE THEREFROM
Filed March 11, 1969
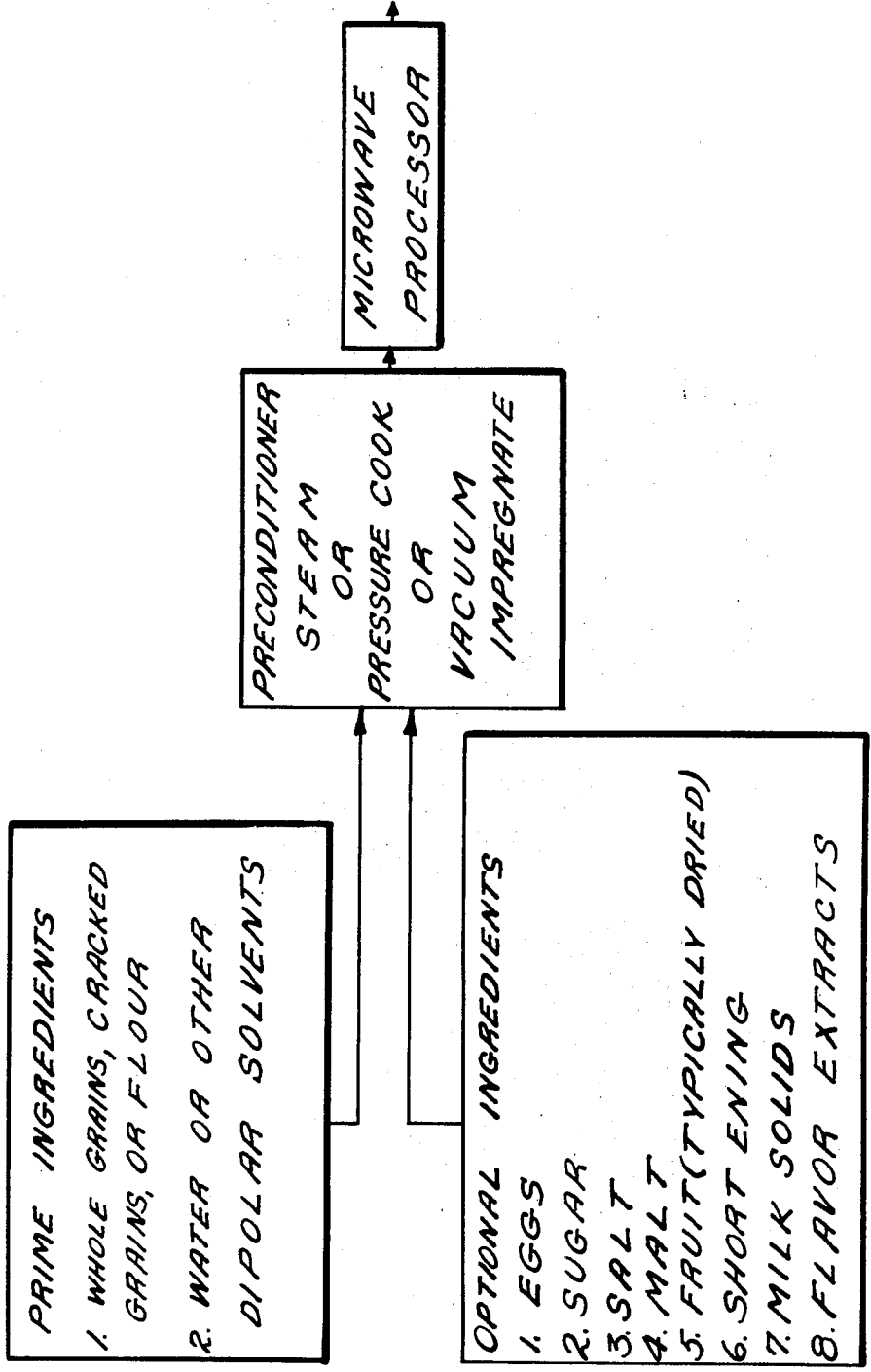
INVENTOR
Roy E. McAlister
BY Cushman, Darby & Cushman
ATTORNEYS United States Patent Office 3,682,651
Patented Aug. 8, 1972

3,682,651
MICROWAVE PUFFING OF CEREAL GRAIN AND
PRODUCTS MADE THEREFROM
Roy E. McAlister, 5285 Red Rock Drive,
Phoenix, Ariz. 85018
Filed Mar. 11, 1969, Ser. No. 806,151
Int. Cl. A23l 1/10
U.S. Cl. 99—83                                    3 Claims

ABSTRACT OF THE DISCLOSURE

A method for producing food products and the food products produced thereby wherein unleavened cereal grain products are made by dispersing a dipolar solvent, such as water, in a medium containing cereal grains and then applying microwave energy to the medium to cause this solvent to vaporize and puff the cereal grains. The puffing may be accomplished at reduced pressure to assist the puffing, and the microwave energy can also be used to dry the food products to the desired moisture. A number of specific food products which can be produced with this process are also disclosed.

BRIEF DESCRIPTION OF THE PRIOR ART AND SUMMARY OF THE INVENTION

The invention relates to a process for producing food products and the food products made thereby.

Cereal grains, first wild and then cultivated, have been used to produce food products for many thousands of years. Today cereal grains in a wide variety are almost universally used in the production of a vast number of different products which make up a large portion of the world's diet. Bread alone is a staple item, eaten in great quantities by most of the people of the United States.

Leavened bread and similar cereal grain products are produced by a process of fermentation which usually involves adding yeast or similar bacterial agents to a mixture of flour, which is simply finely ground wheat or other cereal grain, and a solvent, such as weter, formed into a doughy sticky mass. The fermenting agents cause the mass to expand, i.e. to rise, as the gaseous chemical by-products of fermentation are produced thus leaving myriad pockets of gas honeycombed throughout the dough. This expanded dough is then exposed to heat, i.e. baked, for a given time until the exterior turns brown and hard and the moisture content of the interior has been reduced sufficiently so that the bread is solid and of a chosen consistency.

Despite its almost universal use, the preparation of bread and similar cereal grain products by fermentation has a number of serious disadvantages. First, it requires the use of a large amount of complex and expensive equipment and the baking process is both time consuming and expensive. Even further, some vitamin degradation may result from the chemical leavening agents or from inevitable overheating. Inorganic agents such as baking soda, baking powder and vinegar especially cause severe vitamin degradation at temperatures above 300° F. Replacing this vitamin loss adds considerably to the cost of the final product. Also, the leavening agents must be dispersed homogenously throughout the dough thus requiring mixing and limiting the amount of material which can be dealt with at one time. The expense of the leavening agents, while adding nothing to the final nutritional value of the bread, also adds considerably to the cost of production and hence the cost of the final product. Accordingly, this invention relates to a process for producing nonleavened pastries, breads and other puffed cereal agglomerates by which such products can be quickly, simply and inexpensively produced by employing microwave energy to puff the cereal gains and which eliminates the need for leavening agents such as yeast.

This novel process for preparing non-leavened products involves first dispersing a dipolar solvent such as water in a medium which contains the cereal grains and then applying microwave energy to vaporize the solvent and puff the cereal grains present. The dispersing of the liquid solvent may be accomplished by adding steam to the cereal grains together with whatever other optional ingredients are to be added, or alternately by pressure cooking all of the components together. As yet another alternative, the liquid solvent may be added in a vacuum and such a vacuum may be used so that the microwave energy more quickly puffs the cereal grain with less energy.

The invention also includes a number of specific products which can be manufactured by this novel process and which are particularly beneficial and useful. These products include a flat cracker which is prepared from ground whole wheat and water and which is produced by vacuum or steam impregnating the ground whole wheat to an even moisture, spreading the mixture onto a flat surface and then applying microwave energy so that the wheat is puffed and the product thus expanded to several times its initial volume into a nutritious and delicious final product.

Another product which can be produced is a cereal grain product which resembles peanut brittle with puffed cereal grains in place of peanuts and chemicals added so that the puffed cereal grains taste nut-like. The cereal grains first are soaked or vacuum impregnated with flavoring agents which preferably give a nut-like flavor to the grains and then the mixture is subjected to microwave energy causing the grain to puff. Either before or after the microwave energy is applied, a brittle vehicle such as conventionally employed in peanut brittle recipes may be added.

Yet another novel cereal grain product which can be made is a type of candy-bar or candy-bar replacement in which moistened wheat is blended with sugar products such as brown sugar and glucose in a pre-cooked smooth vehicle also made up of cooking oil and gelatin so that each cereal grain is individually covered with a sticky mass which then binds the cereal grains together. Spread over partially cooked bacon strips or similar products, the entire combination is then subjected to microwave energy which quickly expands the wheat grains to many times their initial size and also dries the binder vehicle until a solid non-sticky candy or candy substitute bar is formed. Other flavoring and nutritional agents, such as dried fruit or meat, can be added for extra nutrition, if desired.

Another product which can be produced by this novel process is a pencil-like stick of cereal grains. This stick is initially composed of a blend of cereal grains such as wheat, rye, barley, etc. moistened with a sticky paste made of cooked wheat flour and water. The sticky mass is then extruded through a suitable container and salted before microwave energy is applied to expand the cereal grains. Such expansion then produces a finished product which is both nutritional and delicious.

Other objects and purposes of the invention will become clear after studying the following detailed description of the drawing.

BRIEF DESCRIPTION OF THE DRAWING

FIG. 1 shows a block diagram setting forth the steps required for the process of this invention to produce the novel food products.

DETAILED DESCRIPTION OF THE DRAWING

FIG. 1 shows a diagrammatic view of the steps required to practice the novel process of this invention. To practice this invention, as shown in the drawing, cereal grains and a dipolar solvent, such as water, are first combined in a preconditioner, together with whatever optional ingredients are required, or desired, to produce any given cereal grain product. As can be seen, these optional products include eggs, sugar, salt, malt, fruit, shortening, milk solids and flavor extracts. Of course, these are only exemplary and many other ingredients can be added. Within this preconditioner the cereal grains and the dipolar solvent are mixed preferably by steam in pressure cooking, or vacuum impregnating the grains with water, preferably to an even moistness, and then the conditioned product is subjected to microwave energy from a microwave processor as shown in the drawing to cause the solvent to vaporize and the cereal grains to quickly puff and thus expand the food product to its final size. If desired, the pressure within the oven or other container where the microwave energy is applied to the food product can be reduced to increase the speed of puffing and decrease the total energy required.

It may also be desirable to add other material to the solvent which will not be vaporized by the microwave energy and which will hold the product together after the solvent is vaporized, for example, a viscous adherent liquid. Other flavoring or nutritional elements may similarly be disposed within the solvent.

The microwave processor shown in FIG. 1 may be a conventional microwave oven or any other suitable source of microwave energy may be employed, as, for example, 12, 2.5 kw. Litton magnetron tubes operating at 2450 megahertz. Similarly, the pre-conditioner may be any conventional device which serves to add solvent to the mixture, either in the form of steam or in other suitable form, as for example, a pressure cooker.

A number of specific products, which have been shown to be particularly beneficial and useful, can be produced by the novel process of this invention as set forth in the drawing, and the invention includes these novel products as well as the process. One product which can be made by this novel process is a flat cracker which has been called Vitabite and which is prepared from just ground whole wheat, water and salt. The ground whole wheat is added to the preconditioner shown in the drawing and then steamed or vacuum impregnated to an even moistness which is preferably between 12 and 26% by weight. In a specific embodiment, steam impregnation of one ounce of ingredient is accomplished in a pressure cooker operating at 15 p.s.i.g. and 275° F. in a matter of 10 minutes. The moist, water impregnated product is then spread evenly in scored sheets or shapes, preferably $\frac{1}{32}$ to $\frac{3}{32}$ inch thick, which can then be broken into serving portions roughly weighing $\frac{1}{5}$ ounce. It is contemplated that the sheet will run continuously at a given width, for example 12 inches. However, a sheet width of 72 inches may be especially desirable in some circumstances and it is further contemplated that equipment to produce this width sheet will be offered.

The surface of each scored sheet is then lightly salted, and the sheet is subjected to microwave energy from a suitable source to cause expansion of the cracker to two to ten times its original volume. In the specific embodiment, this is accomplished by subjecting a $\frac{1}{5}$ ounce scored sheet to a 2450 megahertz field generated by 12, 2.5 kw. Litton magnetron tubes for a period of approximately 90 seconds. While other cereals may be used in place of the ground wheat, wheat has been shown to be particularly desirable and is preferred.

Another product which can be simply and easily produced according to the process of this invention is a puffed wheat brittle material which is similar to peanut brittle except that puffed wheat is substituted for peanuts and which has been called an S-Wheat Treat. The cereal grains employed for this product can be any of the conventional cereals or mixture of cereals and the grains are preferably flavored to taste nut-like by adding proper agents such as benzaldehyde, anise, tincture orris, vanilla, aldehyde and vegetable oils. The final product is preferably made by first soaking or vacuum impregnating the cereal grains with the flavoring agents, which serve as the dipolar solvent, and then microwave puffing the mixture as described above, either before or after addition of a brittle vehicle which is preferably of the type conventionally used in peanut brittle recipes. By way of specific illustration, steam inpregnation of ten pounds of ingredients is achieved in approximately ten minutes under pressure of 15 p.s.i.g. and a temperature of 275° F., while microwave puffing is achieved in approximately 90 seconds in a field of 2450 megahertz generated as previously noted.

Yet another product which can be made by the novel method shown in the drawing is a cereal grain bar which can be used as a breakfast food and which has been called the All American Bar. This particular product is preferably produced by blending moistened wheat or other similar cereal grains with a sweet mixture, which preferably is made of brown sugar in roughly 3.5 parts, glucose in 1.5 parts, oil in .1 part, and gelatin in .075 part, all of the materials in the sweet mixture having previously been cooked together into a smooth vehicle. After each grain has been pre-moistened, as aforesaid, and has been coated with the mixture, this produces a sticky mass, the mass is spread over a number of partially cooked bacon strips, or similar meat or other products, to form discreet bars. These bars are then subjected to microwave energy in the manner discussed above until the wheat is expanded to 4 to 12 times its normal size and the binder vehicle is dry to the touch, it being primarily absorbed over the expanding wheat surface (exposure time approximately 90 seconds for a one ounce bar). Other fruit and meat produces such as dried apples, apricots, peanuts, bacon, or ham bits, as well as other flavor and nutritional agents can be added to provide either variety or additional food value. Other typical candy bar ingredients such as nuts, marshmallow, chocolate, etc. can be added in addition to or in place of some of the above ingredients to produce a candy bar.

Another food product which can be prepared with the above process is comprised of a mixture of cereal grains such as wheat, rye and barley which have been pre-moistened, as aforesaid, with a sticky paste made of cooked wheat flour and water, and extruded through a suitable hole in a container to form a pencil-like stick of any suitable diameter and length. After salting, the sticks are subjected to microwave energy which causes expansion of the cereal grains to 4 to 16 times their initial volume (exposure time approximately 90 seconds for a one ounce stick), thus producing a delicious food product which is not only economical but is also nutritional.

As mentioned above, by employing microwave energy to expand the wheat products and produce unleavened bread, pastries and puffed cereal agglomerates, the disadvantages accompanying the use of leavening agents are substantially eliminated. Thus, ingredients costs are substantially reduced because such leavening agents need not be employed. Even further, frequent destruction of food products due to burns and scorches which commonly results from conventional baking systems which necessarily transfer heat by either surface radiation or conduction is eliminated, as is reduced vitamin degradation due to exposure to chemical leavening agents or by overheating. Also, since no homogeneous dispersion of leavening agents is necessary, the ingredients can be dealt with in any convenient quantities. Accordingly, the process of this invention produces products which are not only superior to the products produced by fermentation but can be produced at a far less cost.

Moreover, it may be possible to materially reduce shipping costs which include spoilage returns by placing microwave ovens in supermarkets and other retail outlets and marketing the product in non-metallic frozen packages which the retail management or customers can prepare at the time of or just prior to demand. Further, such a marketing arrangement ensures that the products will be extremely fresh and it may even be desirable to sell the food products while warm.

Of course, the food products mentioned above which can be produced by this process are not intended to be exhaustive, and it will be apparent that many different products as well as many variations of the products disclosed above can be made by obvious variations. Accordingly, the above examples of the invention are not intended to exhaust the variations and modifications possible and the scope of the invention is intended to be limited only by the scope of the appended claims.

What is claimed is:

1. A method for puffing unleavened cereal grain products comprising the steps of:
    dispersing a dipolar solvent including a viscous adherent liquid in liquid phase in a medium containing cereal grains,
    applying microwave energy to said medium and said solvent to cause said solvent to change from said liquid to a vapor phase, said cereal grains to puff and said adherent liquid to thicken to hold together said medium, and
    reducing the atmospheric pressure surrounding said medium and solvent while said microwave energy is being applied.

2. A method of producing a cereal grain product comprising the steps of:
    moistening a media containing cereal grains so that a net moisture content of 8% to 40%, by weight, results and a viscous adherent liquid,
    applying microwave energy to said moistened media to cause at least some of said cereal grains to expand by conversion of at least some of the moisture into steam, and until said media is dried to a moisture content between 6% to 35% by weight and said adherent liquid to thicken to hold together said media.

3. A puffed cereal grain bar comprising moistened wheat blended with brown sugar, glucose, oil and gelatin, said bar being prepared by mixing said sugar, glucose, oil and gelatin to form a sticky mixture covering each grain of wheat with said sticky mixture thereby binding said grains together, pouring said bound grain mixture over partially cooked bacon strips to form discrete bars and then subjecting said bars to microwave energy to cause said wheat to puff and dry said sticky mixture to form a solid non-sticky bar.

References Cited

UNITED STATES PATENTS

| | | | |
|---|---|---|---|
| 3,556,815 | 1/1971 | Fujiwara | 99—83 X |
| 1,938,981 | 12/1933 | Smith | 99—81 |
| 2,131,450 | 9/1938 | McKay | 99—81 |
| 2,437,150 | 3/1948 | Berg | 99—83 |
| 2,480,679 | 8/1949 | Spencer | 99—81 X |
| 2,602,134 | 7/1952 | Nelson | 99—81 X |
| 2,824,009 | 2/1958 | Lindon | 99—83 X |
| 2,958,602 | 11/1960 | Gilmore | 99—80 R |
| 3,259,503 | 7/1966 | Tan et al. | 99—83 |

FOREIGN PATENTS

| | | | |
|---|---|---|---|
| 238,317 | 4/1962 | Australia | 99—81 |

RAYMOND N. JONES, Primary Examiner